United States Patent
Kleinbongartz

[11] Patent Number: 6,113,089
[45] Date of Patent: Sep. 5, 2000

[54] SCREW CLAMP

[75] Inventor: Wolfgang Kleinbongartz, Remscheid, Germany

[73] Assignee: Kleinbongartz & Kaiser, Remscheid, Germany

[21] Appl. No.: 09/115,707

[22] Filed: Jul. 15, 1998

[30] Foreign Application Priority Data

Jul. 29, 1997 [DE] Germany ............ 297 13 483 U

[51] Int. Cl.[7] ............................................. B25B 1/02
[52] U.S. Cl. ................... 269/166; 269/171.5; 269/224; 269/249; 269/258
[58] Field of Search ............................ 403/77, 24, 144, 403/138; 269/249, 224, 258, 166–171.5

[56] References Cited

U.S. PATENT DOCUMENTS

| | | | |
|---|---|---|---|
| 1,929,539 | 10/1933 | Steuernagel | 269/171.5 |
| 2,708,590 | 5/1955 | Latzen | 403/144 |
| 2,867,003 | 1/1959 | Stiles | 269/249 |
| 2,894,548 | 7/1959 | Peck et al. | 269/258 |
| 4,102,585 | 7/1978 | Herbenar | 403/144 |
| 4,163,617 | 8/1979 | Nemoto | 403/144 |
| 5,052,793 | 10/1991 | Lapp et al. | 269/249 |

FOREIGN PATENT DOCUMENTS 3218486  11/1983  Germany.

Primary Examiner—Robert C. Watson
Attorney, Agent, or Firm—Martin A. Farber

[57] ABSTRACT

A screw clamp (1) having a fixed bracket (3) with a clamping surface (4), and having a sliding bracket (5) which can be displaced and secured on a slide rail (2, 2'), the rail being connected to the fixed bracket (3), and the sliding bracket being a carrier for a threaded spindle (7) with a rotatably mounted clamping plate (11) at its end. The clamping plate (11) is mounted such that it can yield resiliently with respect to the sliding bracket (5) in the direction in which the spindle extends.

8 Claims, 2 Drawing Sheets

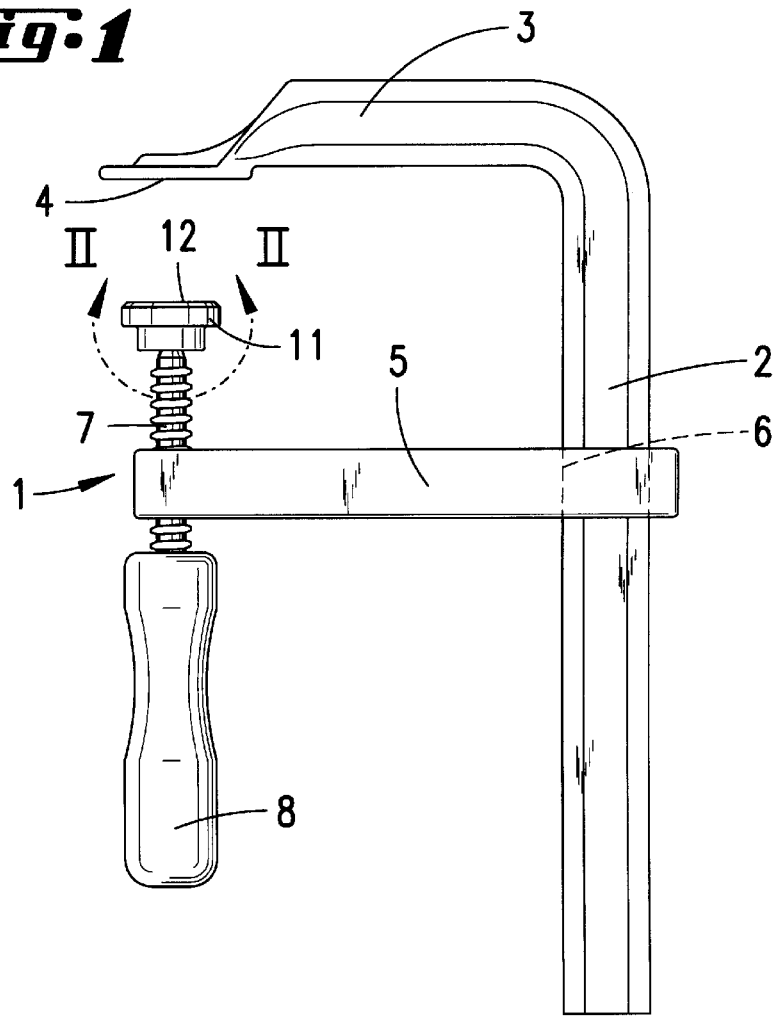
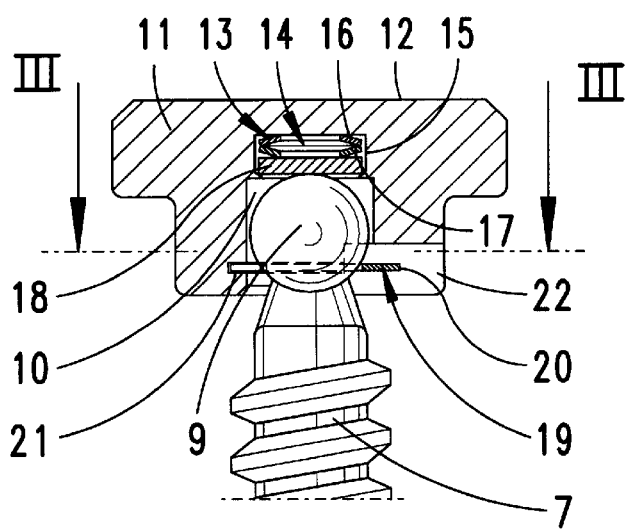
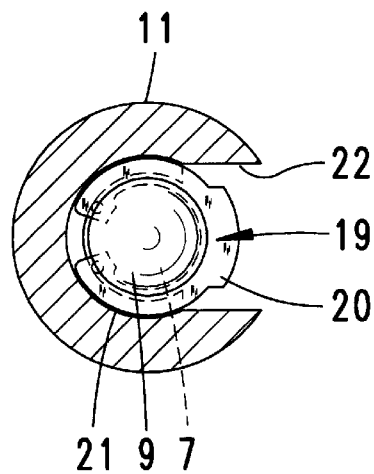

SCREW CLAMP

FIELD AND BACKGROUND OF THE INVENTION

The invention relates to a screw clamp having a fixed bracket with a clamping surface, and having a sliding bracket which can be displaced and secured on a slide rail, the rail being connected to the fixed bracket, and the sliding bracket being carrier for a threaded spindle with a rotatably mounted clamping plate at its end.

Various embodiments of such screw clamps are known. For example, so-called all-steel screw clamps are commercially available, in which the fixed bracket and the slide rail are made integrally, for example from cold-drawn steel. Also known are screw clamps in which a fixed bracket made, for example, from malleable cast iron, is arranged fixedly on a steel slide rail. A sliding bracket produced, for example, from malleable cast iron can be displaced on the steel slide rail. In the case of the known screw clamps, the sliding bracket is braced, when a workpiece is clamped in, such that it is secured on the slide rail. Furthermore, in this case, various auxiliary means are known for the purpose of forming an antislip device. For example, DE-A1 32 18 486 may be mentioned in this context. This document contains an antislip device in the region of the through-passage between slide rail and sliding bracket. This device takes effect as soon as a workpiece is clamped in between the clamping plate and the fixed bracket. However, it has turned out, in particular in the case of all-steel screw clamps, that, despite the abovementioned antislip device, these screw clamps tend to loosen in the presence of vibration.

SUMMARY OF THE INVENTION

Having regard to the above-described state of the art, it is an object of the invention to provide a screw clamp, in particular an all-steel screw clamp, which is more secure with respect to vibration.

According to the invention the clamping plate is mounted such that it can yield resiliently with respect to the sliding bracket in the direction in which the spindle extends. This configuration advantageously counteracts loosening of the screw clamp by vibration. These vibrations are advantageously absorbed by the clamping plate, which can yield resiliently, as a result of which it is not possible for the vibration to have an adverse effect on the securing of sliding bracket and slide rail. The jolts acting on the clamping plate by way of the vibration are not transmitted, or at least are not transmitted with a detrimental effect, to the threaded spindle, and thus to the sliding bracket. The mounting of the clamping plate, which can yield resiliently, is preferably effected by a resilient element which is provided in the clamping plate. This resilient element may be formed, for example, as a plastics part which is elastic and can thus absorb vibrations. It is also conceivable to use a spring as resilient element. As is known from the prior art, the clamping plate is arranged on the threaded spindle such that the plate can be adjusted with tumbling action to the surface of the workpiece which is to be clamped in. For this purpose, that end of the threaded spindle which is directed towards the clamping plate has an articulation head, which is received in the clamping plate. In this context, the invention provides that the articulation head of the spindle end is underlaid by the resilient element. Accordingly, the resilient element is advantageously positioned, in axial extension of the threaded spindle, between the clamping surface of the clamping plate and the articulation head, as a result of which the jolts acting directly on the articulation head via the clamping surface are intercepted by the interposed resilient element. In an advantageous development of the subject matter of the invention, it is provided that the resilient element is a cup-spring arrangement which is positioned in a recess between the clamping surface of the clamping plate and the articulation head. It is also provided, in this respect, that the articulation head engages against a force-transmission plate which covers over the cup-spring arrangement, the cup-spring arrangement having two cup springs. Accordingly, the clamping plate is supported on the articulation head via the two cup springs and the interposed force-transmission plate, and is thus mounted such that it can yield resiliently with respect to the sliding bracket. The two cup springs are arranged, in conventional manner, in opposite directions and are protected, by the interposed force-transmission plate, against shifting or against damage by the articulation head in the event of the clamping plate pivoting. In order for the clamping plate to be configured in an exchangeable manner as a wearing part, it is provided that the articulation head is fixed in the axial direction in the clamping plate by a releasable restraining part. It is thus extremely simple, once the clamping surface has been subjected to wear, for the clamping plate to be lifted off and exchanged following release of the restraining part from the articulation head. In this context, it is also provided that the restraining part is a hairpin spring. In the installed position, this engages the articulation head from beneath and is secured in the clamping plate. In this case, the through-passage opening formed in the region of the hairpin spring is selected to be smaller than the articulation-head diameter, as a result of which the articulation head is reliably retained in the installed position. For the purpose of removing the clamping plate, it is extremely simple to draw the hairpin spring preferably radially outwards in order to release the articulation head. In a development of the subject matter of the invention, it is provided that the restraining part is a securing ring which is positioned in an inner annular groove. In the coupling position of articulation head and clamping plate, this securing ring is reliably retained in the inner annular groove of the clamping plate such that it cannot drop out. In addition, the diameter of the opening of the securing ring is selected to be smaller than the diameter of the articulation head. In order to release the connection, the securing ring is drawn radially outwards from the inner annular groove, whereupon the articulation head is released. In a development of the subject matter of the invention, it is provided that the screw clamp has a steel rail which is connected to the fixed bracket and has longitudinal-edge grooving and, in the region of its guide eyelet, the sliding bracket has an antislip device which is likewise toothed. When a workpiece is clamped in, the sliding bracket tilts with respect to the slide rail, and in this position the antislip device engages in the longitudinal-edge grooving of the steel slide rail. As a result, in the clamping position, the sliding bracket is secured against slipping. Finally, it is advantageously provided that the antislip device is a steel pin which projects into the eyelet in the region of the securing edge. The steel pin extends preferably transversely with respect to the direction of displacement of the sliding bracket and, by way of its toothing arrangement, acts on a longitudinal-edge grooving provided on a narrow side of the rail.

BRIEF DESCRIPTION OF THE DRAWINGS

With the above and other objects and other advantages in view, the present invention will become more clearly understood in connection with the detailed description of preferred embodiments, when considered with the accompanying drawings of which:

FIG. 1 shows a side view of a first embodiment of a screw clamp according to the invention;

FIG. 2 shows an illustration, which is partially in section, of a detail according to the region II—II in FIG. 1;

FIG. 3 shows the section along line III—III in FIG. 2;

DETAILED DESCRIPTION OF THE PREFERRED EMBODIMENTS

Figure 4:
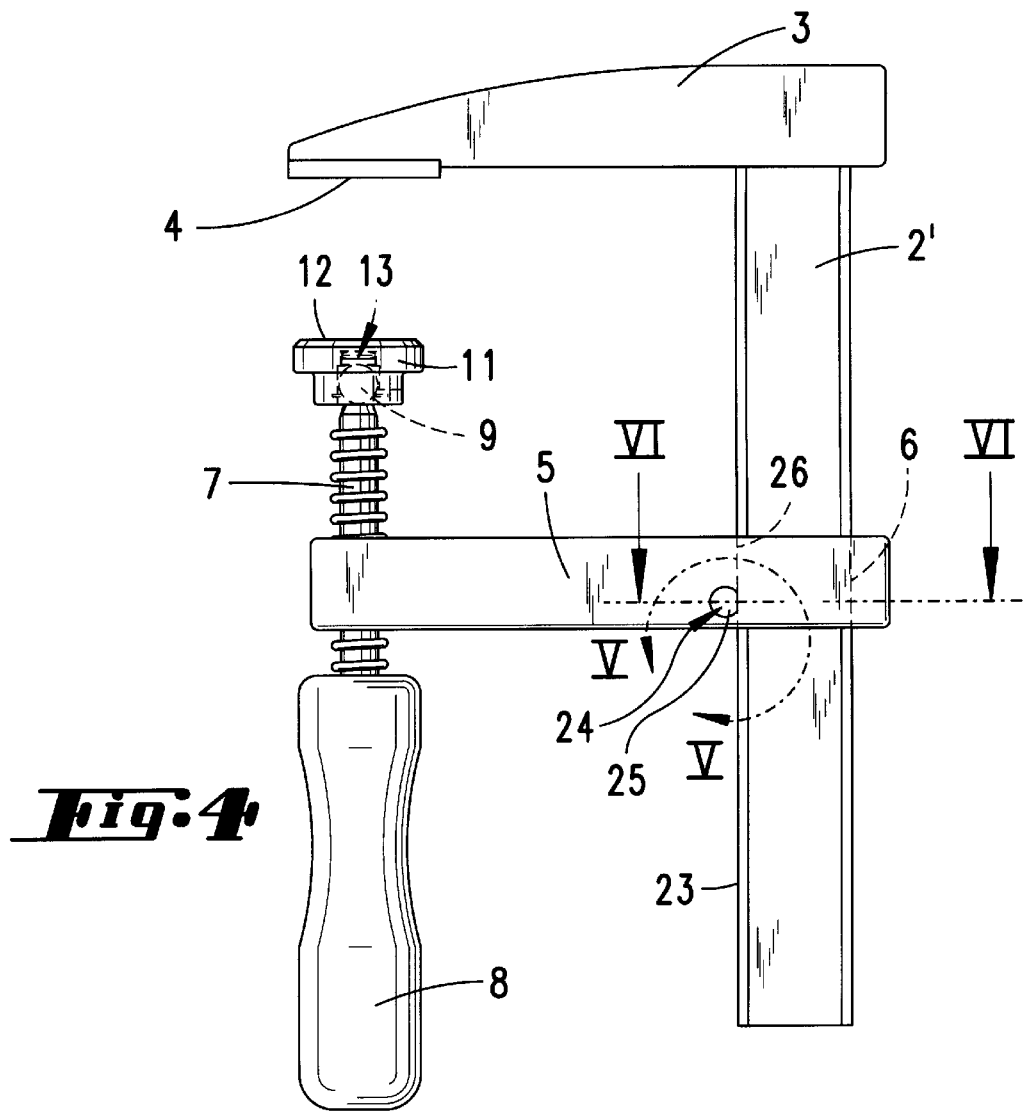
FIG. 4 shows an illustration corresponding to FIG. 1, but relating to a second embodiment.

Illustrated and described, first of all with reference to FIG. 1, is a first exemplary embodiment of a screw clamp 1 in the form of an all-steel screw clamp. This screw clamp may, for example, comprise a cold-drawn steel, a-slide rail 2 and a fixed bracket 3, which extends at right angles to the slide rail 2, at one end of the rail, being formed integrally. In the free end region, the fixed bracket 3 provides a clamping surface 4 on the underside.

A sliding bracket 5 is mounted displaceably on the slide rail 2. The sliding bracket likewise extends substantially perpendicularly with respect to the slide rail 2 and provides an eyelet 6 for the through-passage of the rail.

In the freely extending end region, the sliding bracket 5 has a threaded bore (not illustrated any more specifically) which runs parallel to the longitudinal extent of the slide rail and is intended for receiving a threaded spindle 7. The latter may be formed, in a known manner, as a smooth-running steel spindle with trapezoidal thread.

At the end which is directed away from the fixed bracket 3, the threaded spindle 7 has a rotary handle 8. The other end of the threaded spindle 7 is formed as a substantially spherical articulation head 9, which is received in an articulation pocket 10 of a clamping plate 11. By way of its planar topside, which is directed towards the clamping surface 4 of the fixed bracket 3, this clamping plate 11 provides a counter clamping surface 12. A workpiece can be clamped in between the two clamping surfaces 4 and 12 by adjusting the clamping width by means of displacement of the sliding bracket 5 on the slide rail 2 and subsequent rotary displacement of the threaded spindle 7, along with the associated axial displacement of the clamping plate 11.

Rather than being transmitted directly into the threaded spindle 7 via the clamping plate 11, the forces which arise during the clamping-in operation are transmitted indirectly by the interposition of a resilient element 13. In the exemplary embodiment shown, the latter is a cup-spring arrangement 14 which is set into a recess 15. The arrangement is selected such that the cup-spring arrangement 14, which comprises two cup springs 16, 17, is aligned, in extension of the threaded-spindle axis, between the articulation head 9 and the counter clamping surface 12.

Located between the cup-spring arrangement 14, or the bottom cup spring 17, and the articulation head 9, is a force-transmission plate 18, which is likewise positioned in the recess 15 (see FIG. 2).

By way of the interposed resilient element 13 in the form of a cup-spring arrangement 14, the clamping plate 11 is mounted such that it can yield resiliently with respect to the sliding bracket 5 in the direction in which the spindle extends. This has the advantageous effect of the screw clamp 1 not being able to loosen as a result of vibrations when a workpiece has been clamped in. The jolts initiated by the vibrations are absorbed extremely simply by the resilient element 13 and are not transmitted, or are not transmitted with a detrimental effect, to the threaded spindle 7, and thus to the sliding bracket 5.

With frequent use, the clamping plate 11, or its counter clamping surface 12, is subject to wear. In order for the clamping plate 11 to be configured in an exchangeable manner, there is provided a releasable restraining part 19 which is in the form of a securing ring 20 and fixes the articulation head 9 of the threaded spindle 7 in the axial direction in the clamping plate 11 (see FIG. 2).

The arrangement here is selected such that, on the side which is directed towards the threaded spindle 7, the articulation head 9 is engaged from beneath by the restraining part 19, or the securing ring 20, in the manner of a constriction. Accordingly, the internal diameter of the securing ring 20 is selected to be smaller than the diameter of the articulation head.

The securing ring 20 is aligned substantially perpendicularly with respect to the threaded-spindle axis and parallel to the mating clamping surface 12 of the clamping plate 11, and is positioned in an inner annular groove 21 of the clamping plate 11.

In order to release the articulation connection, the securing ring 20 can be drawn radially outwards, for which purpose the clamping plate 11 has a radially aligned removal recess 22, which is open both towards the underside of the clamping plate 11 and also towards the lateral surface thereof. The width of this removal recess, as measured perpendicularly with respect to the threaded-spindle axis, is selected to be somewhat smaller than the diameter of the inner annular groove 21, with the result that, when positioned in the inner annular groove 21, the securing ring 20 is secured against dropping out. The axially measured height of the removal recess 22, which extends into the articulation pocket 10, is selected to be large enough for that region of the securing ring 20 which is exposed in this recess 22 to be able to be gripped easily, for example by means of a pliers.

Once the securing ring 20 has been drawn off radially, the clamping plate 11 can be lifted off from the threaded spindle 7. Once a new clamping plate 11 has been placed in position, the securing ring 20 is pressed into the inner annular groove 21 again in an extremely simple manner.

Instead of the securing ring 20 shown in the illustrations, it is also possible for a hairpin spring to be used as the restraining part 19.

If the threaded spindle 7 has been displaced downwards to the point where the clamping plate 11 rests on the sliding bracket 5, then the threaded spindle 7 idles in a known manner, with the result that the clamping plate 11 is not subjected to any lifting forces which disengage the articulation connection.

A second embodiment of a screw clamp 1 is illustrated in FIG. 4. This screw clamp is made up substantially of a steel slide rail 2', at one of the free ends of which there is provided a fixed bracket 3 made, for example, of malleable cast iron. At its freely extending end, said fixed bracket also has a clamping surface 4 on the underside.

A sliding bracket 5 likewise made, for example, of malleable cast iron, is mounted displaceably on the steel slide rail 2'. At its free end, this sliding bracket 5 carries a threaded spindle 7 with a clamping plate 11 and rotary handle 8.

In this exemplary embodiment also, a resilient element 13 in the form of a cup-spring arrangement 14 is located, in the region of the clamping plate 11, between the articulation head 9 and the counter clamping surface 12 for the purpose of preventing the screw clamp 1 from loosening as a result of vibrations.

It is also the case here that the clamping plate 11 is retained releasably on the threaded spindle 7 in accordance with the first embodiment.

Additionally provided in this second embodiment is a longitudinal-edge grooving 23 of the steel slide rail 2'. This is formed as fine toothing of the longitudinal-edge surface.

The sliding bracket 5 has an antislip device 24 which cooperates with this longitudinal-edge grooving 23 and is in the form of a steel pin 25. This steel pin is arranged in the region of the securing edge 26, a sub-region of the steel pin 25 projecting into the eyelet 6 of the sliding bracket 5 and being provided there with a toothing arrangement 27.

Figure 5:
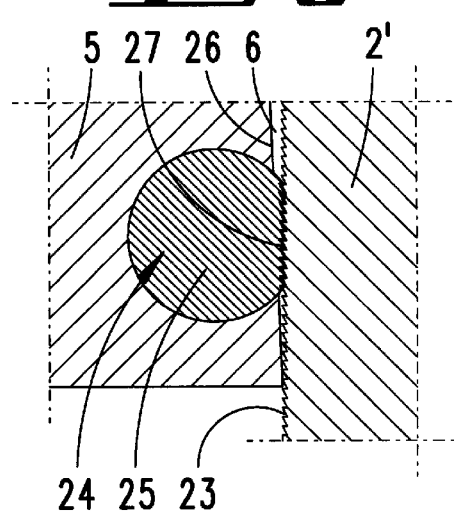
FIG. 5 shows, on an enlarged scale, a detail according to the region V—V in FIG. 4, but illustrated in section.
Figure 6:
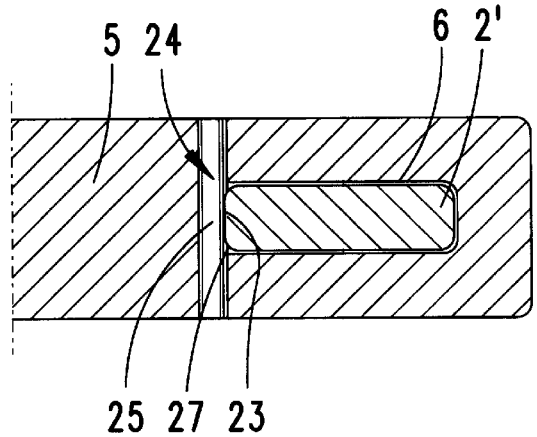
FIG. 6 shows the section along line VI—VI in FIG. 4.

If a workpiece is then clamped in between fixed bracket 3 and sliding bracket 5, or between the clamping surfaces 4 and 12 thereof, then the sliding bracket 5 tilts with respect to the steel slide rail 2' (see FIG. 5). This results in the toothing arrangement 27 of the steel pin 25 engaging in the longitudinal-edge grooving 23 of the steel slide rail 2'. This prevents, in an extremely simple manner, the sliding bracket 5 from slipping along the steel slide rail 2'.

Once the bracing has been released, the sliding bracket 5 can be tipped back from its tilted position with respect to the steel slide rail 2', which simultaneously results in the toothing engagement being disengaged. Thereafter, the sliding bracket 5 can be displaced freely on the steel slide rail 2'.

What is claimed is:

1. Screw clamp (1) having a fixed bracket (3) with a clamping surface (4), and having a sliding bracket (5) which can be displaced and secured on a slide rail (2, 2'), the rail being connected to the fixed bracket, and the sliding bracket being a carrier for a threaded spindle (7) with a rotatable mounted clamping plate (11) at its end;

wherein the clamping plate is mounted such that it can yield resiliently with respect to the sliding bracket in the direction in which the spindle extends;

the screw clamp further comprises a resilient element (13) provided in the clamping plate;

an articulation head (9) of the spindle end is underlaid by the resilient element; and the resilient element is a cup-spring arrangement which is positioned in a recess between a clamping surface of the clamping plate and the articulation head.

2. Screw clamp according to claim 1, wherein the articulation head engages against a force-transmission plate (18) which covers over the cup-spring arrangement, the cup-spring arrangement having two cup springs (16, 17).

3. Screw clamp (1) having a fixed bracket (3) with a clamping surface (4), and having a sliding bracket (5) which can be displaced and secured on a slide rail (2, 2'), the rail being connected to the fixed bracket, and the sliding bracket being a carrier for a threaded spindle (7) with a rotatable mounted clamping plate (11) at its end;

wherein the clamping plate is mounted such that it can yield resiliently with respect to the sliding bracket in the direction in which the spindle extends;

the screw clamp further comprises a resilient element (13) provided in the clamping plate;

an articulation head (9) of the spindle end is underlaid by the resilient element; and the articulation head is fixed in the axial direction in the clamping plate by a releasable restraining part (19).

4. Screw clamp according to claim 3, wherein the restraining part (19) is a hairpin spring.

5. Screw clamp according to claim 3, wherein the restraining part is a securing ring (20) which is positioned in an inner annular groove (21).

6. A screw clamp having a fixed bracket with a clamping surface, and a sliding bracket displaceable along a slide rail of the fixed bracket toward the clamping surface, the clamp comprising:

a spindle threadely secured to the sliding bracket for advancement toward the clamping surface upon rotation about a thread of the spindle;

a clamping plate disposed on a forward end of the spindle facing the clamping surface; and a mounting assembly for mounting the clamping plate to the spindle;

wherein the mounting assembly comprises an articulation head of the spindle, a cavity within the clamping plate for receiving the articulation head, a restraining element for securing the articulation head within the cavity, and a resilient element located between a forward surface of the articulation head and an inner surface of the cavity for absorption of vibration to inhibit a loosening of the clamp.

7. A screw clamp according to claim 6, wherein the resilient element is a cup-spring arrangement.

8. A screw clamp according to claim 6, wherein the vibration absorption element is a cup-spring arrangement.

* * * * *